United States Patent
Wang et al.

(10) Patent No.: US 9,590,415 B2
(45) Date of Patent: Mar. 7, 2017

(54) OUTPUT SHORT CIRCUIT PROTECTING DEVICE

(71) Applicant: Chicony Power Technology Co., Ltd., New Taipei (TW)

(72) Inventors: Tzu-Hung Wang, New Taipei (TW); Yung-Hung Hsiao, New Taipei (TW); Chen-Hsiung Lee, New Taipei (TW); Cheng-Chang Hsiao, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 399 days.

(21) Appl. No.: 14/476,167

(22) Filed: Sep. 3, 2014

(65) Prior Publication Data

US 2016/0064918 A1 Mar. 3, 2016

(51) Int. Cl.
| | |
|---|---|
| *H02H 3/08* | (2006.01) |
| *H02H 3/20* | (2006.01) |
| *H02H 3/087* | (2006.01) |
| *H02M 7/00* | (2006.01) |

(52) U.S. Cl.
CPC .............. *H02H 3/20* (2013.01); *H02H 3/087* (2013.01); *H02M 7/00* (2013.01)

(58) Field of Classification Search
USPC ....................................................... 361/93.7
See application file for complete search history.

(56) References Cited

U.S. PATENT DOCUMENTS

2005/0190515 A1* 9/2005 Hallak .................. H02H 3/087
361/90

* cited by examiner

*Primary Examiner* — Ronald W Leja
(74) *Attorney, Agent, or Firm* — Muncy, Geissler, Olds & Lowe, P.C.

(57) ABSTRACT

An output short circuit protecting device electrically connected to a power supplying device includes a first output short circuit protecting unit. The first output short circuit protecting unit includes a sensing unit, a comparing unit, a judging element, and a latching unit. The sensing unit is electrically connected to a switching unit, a first outputting resistor, and a second outputting resistor of the power supplying device. The comparing unit is electrically connected to the sensing unit. The judging element is electrically connected to the comparing unit, and a controller and a signal-controlling terminal of the power supplying device. The latching unit is electrically connected to the judging element and the signal-controlling terminal.

16 Claims, 5 Drawing Sheets

OUTPUT SHORT CIRCUIT PROTECTING DEVICE

BACKGROUND OF THE INVENTION

Field of the Invention

The present invention relates to an output short circuit protecting device, and in particular to an output shirt circuit protecting device which can rapidly stop supplying electricity to an electronic system electrically connected thereto for preventing the electronic system from over-current damage.

Description of Related Art

In general, power supplying device configured to supply electricity to an electronic system usually includes a short circuit protecting module for stopping supplying electricity when the electronic system is short and preventing the electronic system from over-current damage.

The conventional short circuit protecting module is merely configured to transmit a signal to a primary of a power converting module of the power supplying device to stop power conversion when the electronic system electrically connected to the secondary of the power converting module is short. However, the secondary components may be damaged while the signal is transmitting.

SUMMARY OF THE INVENTION

It is an object to provide an output short circuit protecting device. The output short circuit protecting device electrically connected to a power supplying device and an electronic system provides electricity to the electronic system when the electronic system is operated under standby mode and non-standby mode. The output short circuit protecting device can rapidly stop the power supplying device conducting electricity to the electronic system to prevent the electronic system from over-current damage.

Accordingly, the output short circuit protecting device according to one aspect of the present invention is electrically connected to a power supplying device and an electronic system. The power supplying device provides electricity to the electronic system when the electronic system is operated under standby mode and non-standby mode. The power supplying device comprises an alternative current (AC) to direct current (DC) power converting module, a controller, a switching element, a first outputting resistor, a second outputting resistor, a third outputting resistor, a first electricity outputting terminal, a second electricity outputting terminal, a standby electricity outputting terminal, a signal-resetting terminal, and a signal-controlling terminal. The AC to DC power converting module has a DC electricity outputting terminal. The switching element is electrically connected to the DC electricity outputting terminal, the signal-controlling signal, and the signal-resetting terminal. The first outputting resistor is electrically connected to the switching element and the first electricity outputting terminal, the second outputting resistor is electrically connected to the switching element and the second electricity outputting terminal, and the third outputting resistor is electrically connected to the DC electricity outputting terminal and the standby electricity outputting terminal.

The outputting short circuit protecting device comprises a first output short circuit protecting module electrically connected to the first outputting resistor and the second outputting resistor. The first output short circuit protecting module comprises a sensing unit, a comparing unit, a judging element, and a latching unit. The sensing unit is electrically connected to the switching element, the first outputting resistor, and the second outputting resistor. The comparing unit is electrically connected to the sensing unit, the judging element is electrically connected to the comparing unit, the controller, and the signal-controlling terminal, the latching unit is electrically connected to the judging element, the signal-controlling terminal, and the signal-resetting terminal.

The sensing unit senses voltages across the first outputting resistor and the second outputting resistor, the comparing unit respectively determines whether the voltages across the first outputting resistor and the second outputting resistor is larger than a predetermined value or not, the judging element sends a signal to latching unit for latching the signal-controlling terminal and driving the switching element to cut off if one of the voltages across the first outputting resistor and the second outputting resistor is larger than the predetermined value, so that the first electricity outputting terminal and the second electricity outputting terminal stop outputting electricity to the electronic system.

The sensing unit comprises a first operational amplifier and a second operational amplifier, the first operational amplifier comprises an inverting input, a non-inverting input, and an output, the inverting input of the first operational amplifier is electrically connected to the switching element, the non-inverting input of the operational amplifier is electrically connected to the first electricity outputting terminal, the output of the first operational amplifier is electrically connected to the comparing unit, the second operational amplifier comprises an inverting input, a non-inverting input, and an output, the inverting input of the second operational amplifier is electrically connected to the switching element, the non-inverting input of the second operational amplifier is electrically connected to the second electricity outputting terminal, and the output of the second operational amplifier is electrically connected to the comparing unit.

The comparing unit comprises a first comparator and a second comparator, the first comparator comprises an inverting input, a non-inverting input, and an output, the inverting input of the first comparator is electrically connected to the output of the first operational amplifier, the non-inverting input of the first comparator is used for inputting a first reference voltage, the output of the first comparator is electrically connected to the judging element, the second comparator comprises an inverting input, a non-inverting input, and an output, the inverting input of the second comparator is electrically connected to the output of the second operational amplifier, the non-inverting of the second comparator is used for inputting a second reference voltage, and the output of the second comparator is electrically connected to the judging element.

In an embodiment of the present invention, the judging element is, for example, an AND gate.

The latching module comprises a first switch, a second switch, a third switch, a current-limiting resistor, a first voltage-dividing resistor, and a second voltage-dividing resistor. The first switch is electrically connected to the judging element and the signal-controlling terminal. The second switch is electrically connected to the first switch. The third switch is electrically connected to the first switch, the second switch, and the signal-resetting terminal. The current-limiting resistor is electrically connected to the first switch and the second switch. The first voltage-dividing resistor is electrically connected to the second switch. The second voltage-dividing resistor is electrically connected to the first switch and the second switch.

The latching unit further comprises a first filtering capacitor, a second filtering capacitor, and a schottky diode. The first filtering capacitor is electrically connected to the second voltage-dividing resistor in parallel. The second filtering capacitor is electrically connected to the signal-resetting terminal and the third switch. The schottky diode is electrically connected to the judging element, the first switch, and the second switch.

The output short circuit protecting device further comprises a second output short circuit protecting module electrically connected to the third outputting resistor and the controller. The second output short circuit protecting module comprises an operational amplifier, a comparator, and a photo coupler, the operational amplifier comprising an inverting input, a non-inverting input, and an output. The inverting input of the operational amplifier is electrically connected to the DC electricity outputting terminal, and the non-inverting input of the operational amplifier is electrically connected to the standby electricity outputting terminal. The comparator comprises an inverting input, a non-inverting input, and an output. The inverting input of the comparator is electrically connected to the output of the operational amplifier, the non-inverting input of the comparator is used for inputting a third reference voltage, and the output of the comparator is electrically connected to the photo coupler. The photo coupler is electrically connected to the controller.

The photo coupler comprises a lighting element and a light-receiving element, the lighting element is electrically connected to the output of the comparator, and the light-receiving element is electrically connected to the controller.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
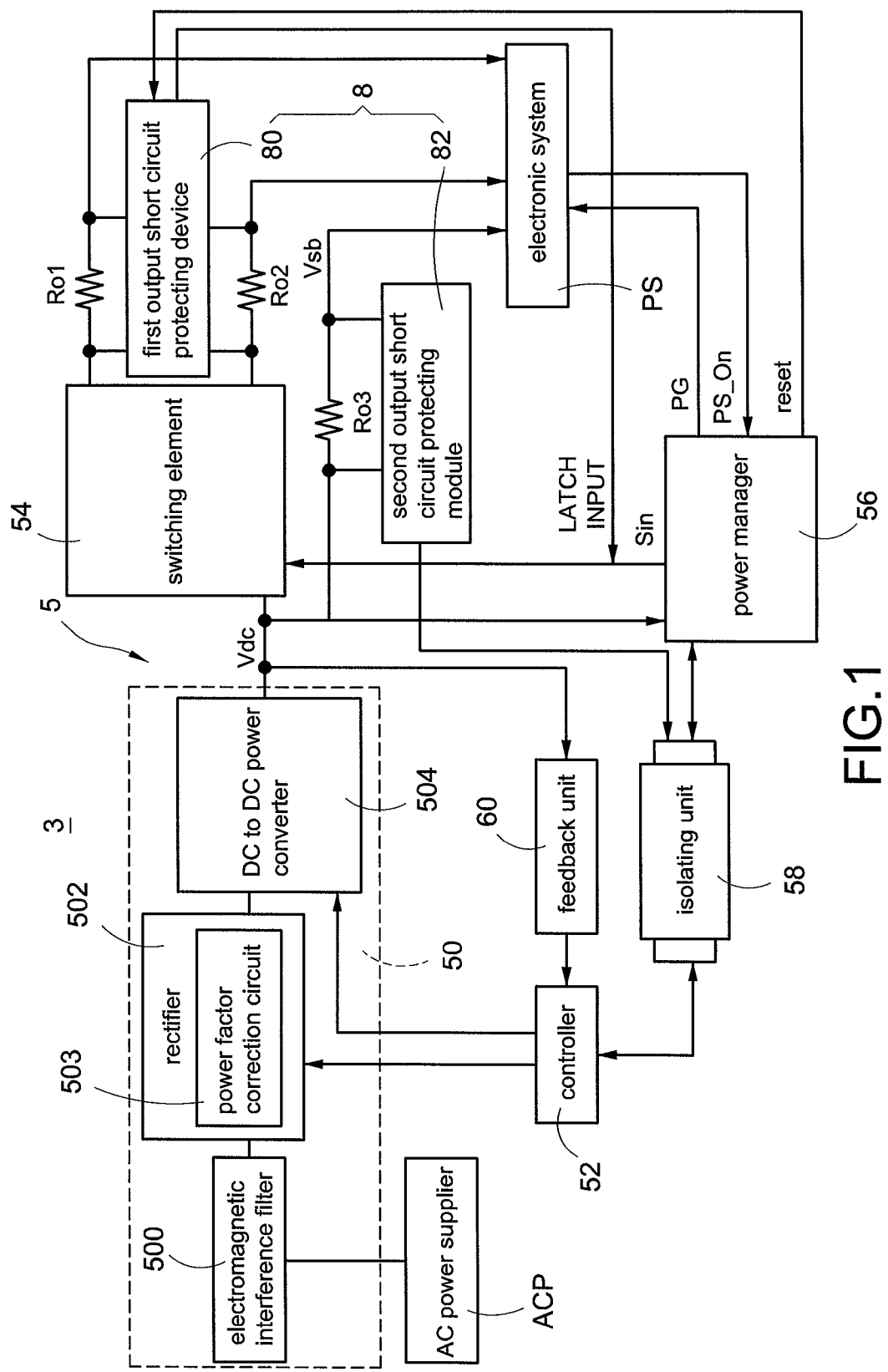
FIG. 1 is a circuit block diagram of a power supplying system according to the present invention.

Reference is made to FIG. 1, which is a circuit diagram of a power supplying system according to the present invention. In convenience, FIG. 1 also shows an alternative current (AC) power supplier ACP and an electronic system PS.

The power supplying system 3 is arranged between the AC power supplier ACP and the electronic system PS and electrically connected thereto. The AC power supplier ACP is used for outputting alternative current (AC) electricity. The power supplying system 3 receives the AC electricity and converts the AC electricity into direct current (DC) electricity. After that, the power supplying system 3 transmits the DC electricity to the electronic system PS. The electronic system PS is, for example, server or computer.

The power supplying system 3 includes a power supplying device 5 and an output short circuit protecting device 8. The output short circuit protecting device 8 is used for stopping the power supplying device 5 outputting DC electricity to the electronic system PS while the electronic system PS operates under a condition of short circuit. The electronic system PS can be operated in a standby mode and a non-standby mode. When the electronic system PS is operated under the standby mode, while most of hardware installed in the electronic system PS is non-activated, some memories are activated. Thus power consumption of the electronic system PS can be reduced when it is operated under standby mode.

The power supplying device 3 includes a first electricity outputting terminal V1, a second electricity outputting terminal V2, and a standby electricity outputting terminal Vsb. The first electricity outputting terminal V1, the second electricity outputting terminal V2, and the standby electricity outputting terminal Vsb are respectively electrically connected to the electronic system PS. In particularly, the power supplying system 3 outputs electricity to the electronic system PS via the standby electricity outputting terminal Vsb not only when the electronic system PS is operated under standby mode, but the non-standby mode. However, the power supplying system 3 outputs electricity to the electronic system PS via the first electricity outputting terminal V1 and the second electricity outputting terminal V2 only when the electronic system PS is operated under non-standby mode. In the other words, the power supplying system 3 cannot outputs electricity to the electronic system PS via the first electricity outputting terminal V1 and the second electricity outputting terminal V2 only when the electronic system PS is operated under standby mode.

The power supplying device 5 includes an alternative current (AC) to direct current (DC) power converting module 50, a controller 52, a switching element 54, a power manager 56 and an isolating unit 58. The AC to DC power converter 5 is electrically connected to the AC power supplier ACP for receiving the AC electricity outputted from the AC power supplier ACP and converting the AC electricity into DC electricity.

The AC to DC power converting module 50 includes an electromagnetic interference filter 500, a rectifier 502, and a direct current (DC) to DC power converter 504. The electromagnetic interference filter 500 is electrically connected to the AC power supplier ACP. The electromagnetic interference filter 20 is configured to filter electromagnetic interference of the AC power source outputted from the AC power supplier ACP. The rectifier 502 is electrically connected to the electromagnetic interference filter 500, and configured to convert the AC electric power outputted from the electromagnetic interference filter 500 into a direct current (DC) electric power. The rectifier 502 is, for example, a full-wave rectifier. The rectifier 502 includes a power factor correction circuit 503 installed therein. The power factor correction circuit 503 is configured to decrease current input therein and boosting voltage outputted therefrom. The DC to DC power converter 504 is electrically connected to the rectifier 502 and is configured to modulate level of DC electricity outputted therefrom, such as boost voltage or buck voltage. The DC to DC power converter 504 is, for example, an LLC power convertor, a dual forward power converter or a single forward power converter. The DC to DC power converter 504 includes a direct current (DC) electricity outputting terminal Vdc.

The switching element 54 is electrically connected to the DC electricity outputting terminal Vdc. The first outputting resistor Ro1 is arranged between the switching element 54 and the first electricity outputting terminal V1 and electrically connected thereto. The second outputting resistor Ro2 is arranged between the switching element 54 and the second electricity outputting terminal V2. The switch element 54 determines whether or not to conduct electricity to the electronic system PS via the first electricity outputting terminal V1 and the second electricity outputting terminal V2 according to signals outputted from the power manager 56. The power manager 56 is electrically connected to the electronic system PS and communicate with electronic system PS in bidirectional for instantaneously detecting the operation modes (standby mode or non-standby mode) of the electronic system PS. In this embodiment, the switching element 54 is, for example, metal-oxide-semiconductor field-effect transistor (MOSFET).

In particular, the switching element 54 closes when the electronic system PS is operated under non-standby mode, thus DC electricity outputted from the DC electricity outputting terminal Vdc is conducted to the electronic system PS via the first electricity outputting terminal V1 and the second electricity outputting terminal V2. On the contrary, the switching element 54 opens when the electronic system PS is operated under standby mode, thus DC electricity outputted from the DC electricity outputting terminal Vdc cannot conducted to the electronic system PS via the first electricity outputting terminal V1 and the second electricity outputting terminal V2.

In should be note that the power factor correction circuit 503 is activated not only when the electronic system PS is operated under non-standby mode, but the standby mode. Thus the power supplying device 5 is applicable for voltage level of 100 to 240 volts.

The power manager 56 is electrically connected to the AC to DC power converting module 50 and the electronic system PS. The power manager 28 includes a signal-outputting terminal PG, a signal-inputting terminal PS_On, a signal-controlling terminal, and a signal-resetting terminal reset. The signal-outputting terminal PG and the signal-inputting terminal PS_On are electrically connected to the electronic system PS, respectively. The power manager 56 transmits signals to the electronic system PS via the signal-outputting terminal PG, and receives signals outputted from the electronic system PS via the signal-inputting terminal PS_On. Thus, the power manager 56 and the electronic system PS can be communicated in bidirectional, and operated mode of the electronic system PS can be confirmed by the power manager 56. The signal-controlling terminal Sin is electrically connected to the switching element 54, so that the power manage switches the switching element 54 according to operation mode of the electronic system PS to conduct to determine whether or not to conduct electricity to the electronic system PS via the first electricity outputting terminal V1 and the second electricity outputting terminal V2.

The isolating unit 58 is electrically connected to the controller 52 and the power manager 56 for isolated-transmitting signals. The signals are not only transmitted from the power manager 56 to the controller 52, but also from the controller 52 to the power manager 56. After that, the controller 52 controls operations the rectifier 502 and the DC to DC power converter 504, such as the level of the DC electricity outputted from the rectifier 502, or the level of the DC electricity outputted from the DC to DC power converter 504. The isolating unit 58 is, for example, photo coupler.

The power supplying system 3 further includes a feedback unit 60 electrically connected to the controller 52 and the DC electricity outputting terminal Vdc. The feedback unit 60 detects the electricity outputted from the DC electricity outputting terminal Vdc and driving the controller 52 to control electricity outputting states and converting efficiency of the rectifier 502 and/or the DC to DC power converter 504.

The power supplying device 5 further includes a third outputting resistor Ro3 electrically connected to the DC electricity outputting terminal Vdc and the standby electricity outputting terminal Vsb. In particularly, the level of voltage outputted from the standby electricity outputting terminal can be the same as that of outputted from the first electricity outputting terminal, however the level of voltage outputted from the standby electricity outputting terminal can be the same as or different from that of outputted from the first electricity outputting terminal. The power supplying system 3 may further include a DC to DC power converter arranged between the standby electricity outputting terminal Vsb and the third outputting resistor Ro3 and electrically connected thereto for boosting voltage or bucking voltage when the level of voltage outputted from the standby electricity outputting terminal is different from that of outputted from the first electricity outputting terminal.

Figure 2:
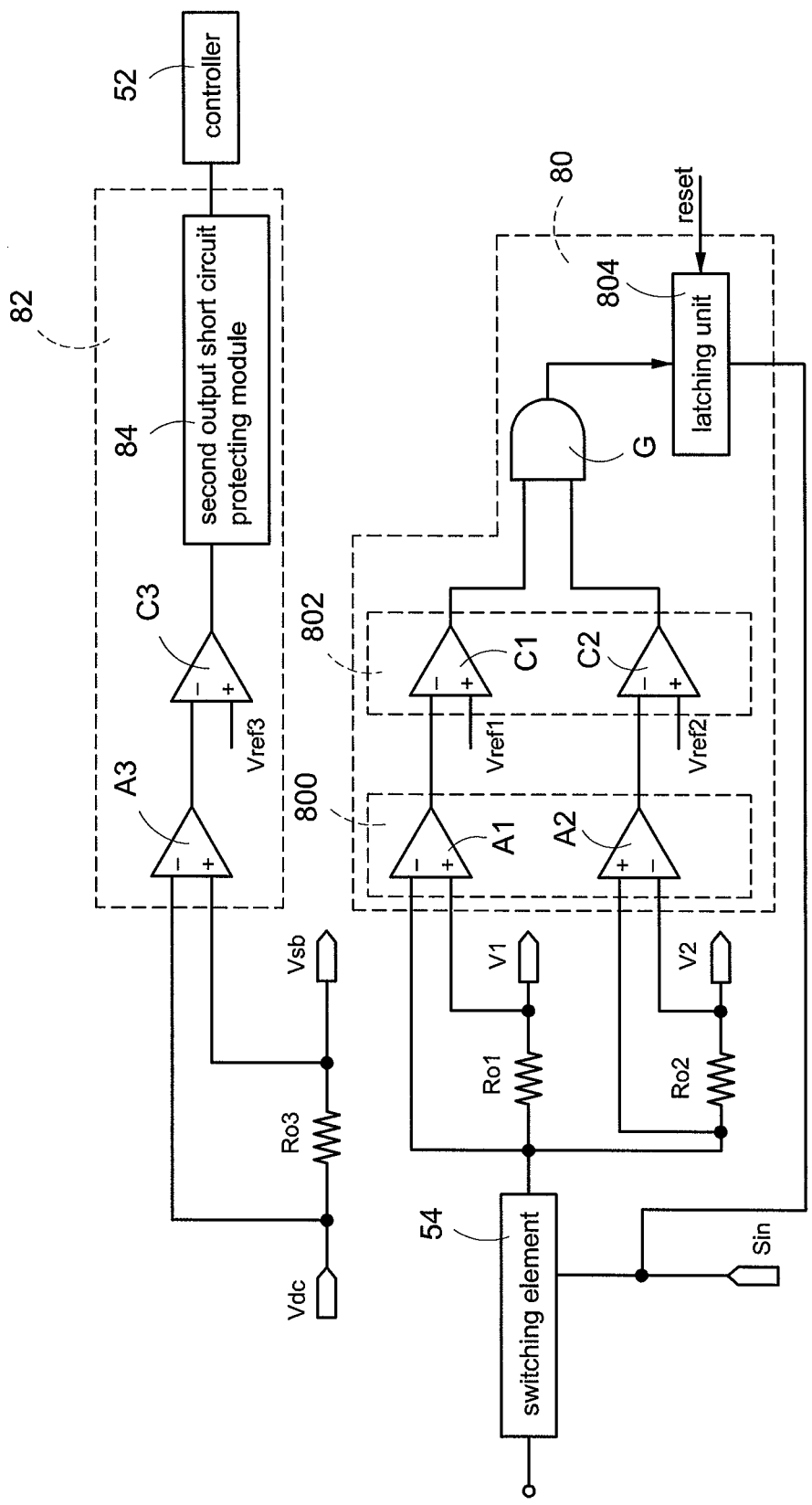
FIG. 2 is a circuit diagram of an output short circuit protecting device according to the present invention.

Reference is made to FIG. 2, which is a circuit diagram of an output short circuit protecting device according to a first embodiment of the present invention. In convenience, FIG. 2 also illustrates the switching element 54, the signal-controlling signal of the power manager 56, the DC electricity outputting terminal Vdc of the DC to DC power converter 504 of the AC to DC power converting module 50, the first outputting resistor Ro1, the second outputting resistor Ro2, the third outputting resistor Ro3, the first electricity outputting terminal V1, the second electricity outputting terminal V2, and the standby electricity outputting terminal Vsb.

The output short circuit protecting device 8 includes a first output short circuit short protecting module 80 and a second output short circuit protecting module 82. The first output shout circuit protecting module 80 is electrically connected to the first outputting resistor Ro1 and the second outputting resistor Ro2 and includes a sensing unit 800, a comparing unit 802, a judging element G, and a latching unit 804.

The sensing unit 800 includes a first operational amplifier A1 and a second operational amplifier A2. The first operational amplifier A1 includes an inverting input, a non-inverting input, and an output. The inverting input of the first operational amplifier A1 is electrically connected to the switching element 54, and the non-inverting input of the first operational amplifier A1 is electrically connected to the first electricity outputting terminal V1. In the other words, the inverting input and the non-inverting input of the first operational amplifier A1 are electrically connected to terminals of the first outputting resistor Ro1, respectively. The second operational amplifier A2 includes an inverting input, a non-inverting input, and an output. The inverting input of the second operational amplifier A2 is electrically connected to the switching element 54, and the non-inverting input of the second operational amplifier A2 is electrically connected to the second electricity outputting terminal V1. In the other words, the inverting input and the non-inverting input of the second operational amplifier A2 are electrically connected to terminals of the second outputting resistor Ro2, respectively.

The comparing unit 802 includes a first comparator C1 and a second comparator C2. The first comparator C1 includes an inverting input, a non-inverting input, and an output. The inverting input of the first comparator C1 is electrically connected to the output of the first operational amplifier A1, and the non-inverting input of the first comparator C1 is used for inputting a first reference voltage Vref1 (namely the non-inverting of the first comparator C1 is electrically connected to the first reference voltage Vref1). The second comparator C2 includes an inverting input, a non-inverting input, and an output. The inverting input of the second comparator C2 is electrically connected to the output of the second operational amplifier A2, and the non-inverting input of the second comparator is used for inputting a second reference voltage Vref2.

The judging element G includes two inputs and an output. The inputs of the judging element G are electrically connected to the outputs of the first comparator C1 and the second comparator C2, respectively, and the output of the judging element G is electrically connected to the latching unit 804. In the present invention, the judging element G is, for example, an AND gate.

The latching unit 804 is electrically connected to the signal-controlling terminal Sin and the signal-resetting terminal reset. The latching unit 804 is configured to latch signals sent from the signal-controlling terminal Sin.

The second output short circuit protecting module 82 is electrically connected to the third outputting resistor Ro3. The second output short circuit protecting module 82 includes an operational amplifier A3, a comparator C3, a photo coupler 84, and a resistor R. the operational amplifier A3 includes an inverting input, a non-inverting input, and an output. The inverting input of the operational amplifier A3 is electrically connected to the DC electricity outputting terminal Vdc, and the non-inverting input of the operational amplifier A3 is electrically connected to the standby electricity outputting terminal Vsb. The comparator includes an inverting input, a non-inverting input, and an output. The inverting input of the comparator C3 is electrically connected to the output of the operational amplifier A3, the non-inverting input of the comparator C3 is used for inputting a third reference voltage Vref3, and the output of the comparator C3 is electrically connected to a lighting element 840 of the photo coupler 84.

Figure 3:
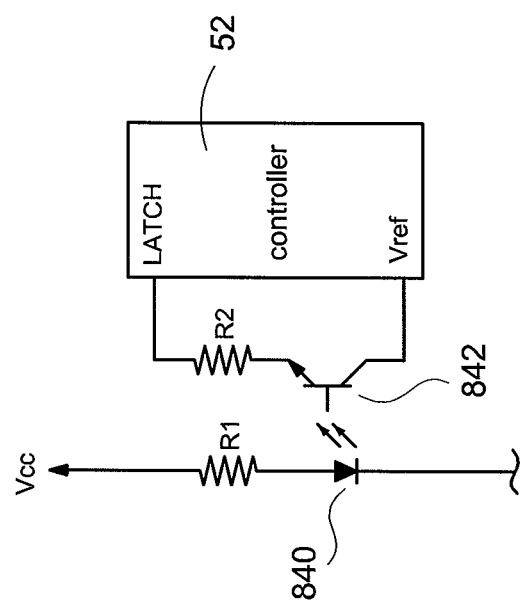
FIG. 3 is a circuit diagram of photo-coupler and controller according to a first embodiment of the present invention.

Reference is made to FIG. 3, the photo coupler 84 includes the lighting element 840 and a light-receiving element 842. The lighting element 840 is, for example, a light emitting diode, and an anode thereof is electrically connected to the DC power source via a first resistor R1. The DC power source drives the lighting element 840 to light. The light-receiving element 842 is electrically to the controller 52 via a second resistor R2. In this embodiment, the light-receiving element 842 is, for example, a phototransistor, a connector thereof is electrically connected to a voltage-providing end Vref of the controller 52, and an emitter thereof is electrically connected to the a latching end LATCH of the controller 52. The controller 52 outputs a voltage for driving the light-receiving element 842 from the voltage-providing end Vref.

Figure 4:
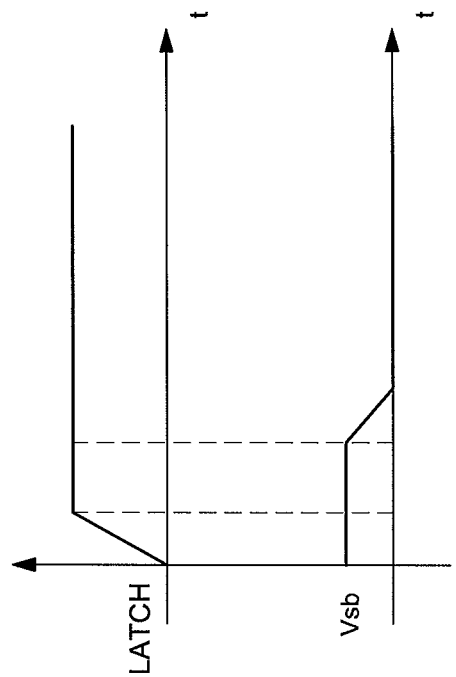
FIG. 4 is a time diagram illustrating operations of the signal-controlling end and the standby electricity outputting terminal according to the first embodiment of the present invention.

The second output short circuit protecting module 82 is configured to provide short circuit protection when the electronic system PS is operated under standby mode. when the electronic system PS is short, the current outputted from the standby electricity outputting terminal Vsb increases, thus the voltage across the third outputting resistor Ro3 also increases. While the voltage across the third outputting resistor Ro3 is larger than a predetermined value, the operational amplifier A3 sends an amplified signal with low logic level. The comparator c3 compares the signal outputted from the output of the operational amplifier A3 and a third reference Vref3, and then sends a compared signal with low logic level to the light element 840 of the photo coupler 84 to drive the lighting element to light when the amplified signal is larger than the third reference voltage Vref3. The light-receiving element 842 is conduct by sensing light emitted from the lighting element 840 thereafter, the controller 52 stops the rectifier 502 and/or the DC to DC power converter 504 converting electricity when a driving signal is transmitted to the latching terminal LATCH of the controller 52, and there is no electricity outputted from the standby electricity outputting terminal Vsb. It should be noted that when the short circuit condition is dismissed from the electronic system PS, there is still no electricity outputted from the standby electricity outputting terminal Vsb. FIG. 4 shows a time diagram illustrating operations of the signal-controlling terminal and the standby electricity outputting terminal.

Figure 5:
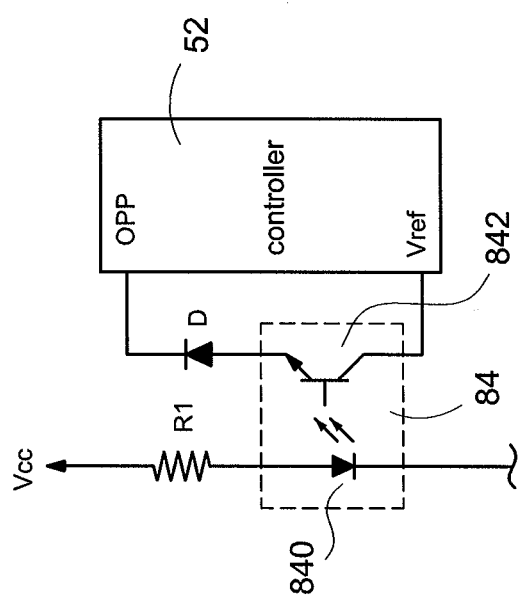
FIG. 5 is a circuit diagram of photo-coupler and controller according to a second embodiment of the present invention.

Reference is made to FIG. 5, the optical coupler 84 includes a lighting element 840 and a light-receiving element 842. In this embodiment, the lighting element 840 is, for example, light emitting diode, and an anode thereof is electrically connected to a DC power source via a first resistor R1. The DC power source drives the lighting element 840 to light. The light-receiving element 842 is electrically connected to the controller 522 via the controller 52. In this embodiment, the light-receiving element 842 is, for example, a phototransistor, a collector thereof is electrically connected to a voltage-providing end Vref of the controller 52, and an emitter thereof is electrically connected to an over-voltage protecting end OPP of the controller 52. The controller 52 outputs a voltage for driving the light-receiving element 842 from the voltage-providing end Vref.

The second output short circuit protecting module 82 is configured to provide short circuit protection when the electronic system PS is operated under standby mode. when the electronic system PS is short, the current outputted from the standby electricity outputting terminal Vsb increases, thus the voltage across the third outputting resistor Ro3 also increases. While the voltage across the third outputting resistor Ro3 is larger than a predetermined value, the operational amplifier A3 sends an amplified signal with low logic level. The comparator c3 compares the signal outputted from the output of the operational amplifier A3 and a third reference Vref3, and then sends a compared signal with low logic level to the light element 840 of the photo coupler 84 to drive the lighting element to light when the amplified signal is larger than the third reference voltage Vref3. The light-receiving element 842 is conduct by sensing light emitted from the lighting element 840 thereafter, the controller 52 stops the rectifier 502 and/or the DC to DC power converter 504 converting electricity when a driving signal is transmitted to the latching terminal LATCH of the controller 52, and there is no electricity outputted from the standby electricity outputting terminal Vsb.

When no electricity flow through the standby electricity outputting terminal Vsb, the voltage across the third outputting resistor Ro3 is zero, thus the output of the operational amplifier A3 outputs an amplified signal with high logic level, and the comparator C3 also outputs a compared signal with high logic level to drive light element to turn off. After that the controller 52 drives the rectifier 502 and/or the DC to DC power converter 504 to activate, thus the power supplying system 3 outputs electricity to the electronic system PS via the standby electricity outputting terminal Vsb. It should be noted that the electricity outputted from the standby electricity outputting terminal Vsb after short circuit condition is smaller than that of outputted before short circuit condition. While the electronic system PS is stall operated under short circuit condition, the amplified signal outputted from the operational amplifier A3 and the compared signal outputted from the comparator C3 respectively has low logic level, this the controller 503 drives the rectifier 502 and\or the DC to DC power convertor 504 stop to convert electricity.

In short, when the electronic system PS operated under standby mode is short, the second output short circuit protecting unit 82 makes the controller 52 drive the rectifier 502 and/or the DC to DC power convertor 504 stop converting electricity, and there is no electricity transmitted to the electronic system PS via the standby electricity outputting terminal Vsb. After that, the controller 52 activates the rectifier 502 and/or the DC to DC power converter 504. When the electronic system PS is still short, the controller 52 drives the rectifier 502 and/or the DC to DC power converter 504 stop power conversion. However, if the short circuit condition of the electronic system PS is dismissed, electricity outputted from the DC to DC power converter 504 is automatically transmitted to the electronic system PS via the standby electricity power outputting terminal Vsb.

Figure 6:
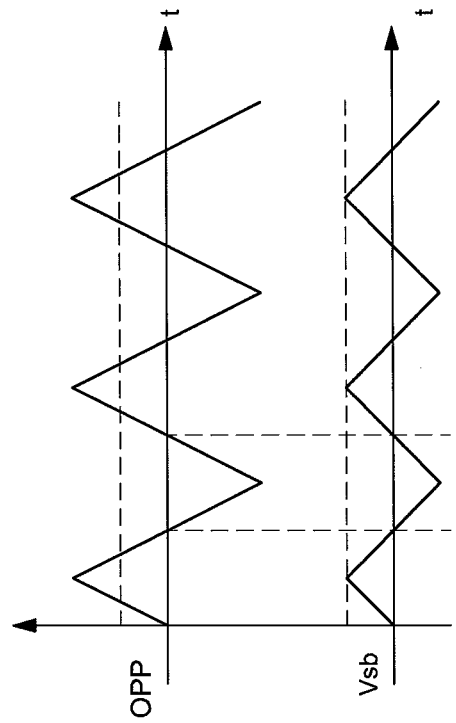
FIG. 6 is a time diagram illustrating operations of the over-voltage protecting end and the standby electricity outputting terminal according to the second embodiment.

FIG. 6 is a time diagram illustrating operations of the over-voltage protecting end OPP and the standby electricity outputting terminal according to the second embodiment. As shown in the FIG. 6, the signal outputted from the over-voltage protecting end OPP vibrate upwardly and downwardly.

Figure 7:
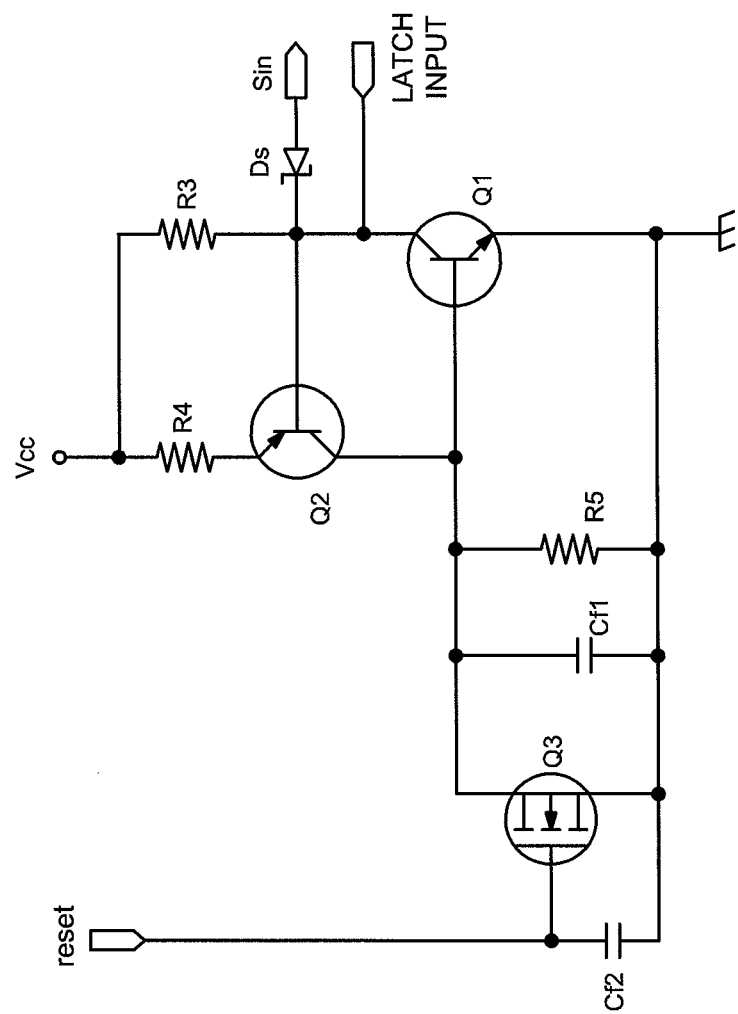
FIG. 7 is a circuit diagram of a latch unit according to the present invention.

Reference is made to FIG. 7, which is a circuit diagram of the latching unit according to the present invention. The latching unit 804 includes a first switch Q1, second switch Q2, a third switch Q3, current-limiting resistor R3, a first voltage-dividing resistor R4, a second voltage-dividing resistor R5, a first filtering capacitor Cf1, a second filtering capacitor Cf2, a schottky diode Ds having characteristic of low conducting voltage, and a signal-inputting terminal INPUT. In this embodiment, the first switch Q1 is a NPN transistor, an emitter thereof is electrically connected to ground, and a collector thereof is electrically connected to a DC power source Vcc via the current-limiting resistor R3. The second switch Q2 is a PNP transistor, an emitter thereof is electrically connected to the DC power source Vcc, a base thereof is electrically connected to a cathode of the schottky diode Ds, and a collector thereof is electrically connected to a base of the first switch Q1. One end of the second voltage-dividing resistor R5 is electrically connected to the base of the first switch Q1 and the other is electrically connected to ground. One end of the first filtering capacitor Cf1 is electrically connected to the first switch Q1 and the other is electrically connected to ground, namely the first filtering capacitor Cf1 is electrically connected to the second voltage-dividing resistor R5 in parallel. The third switch Q1 is an N-channel metal-oxide-semiconductor field-effect transistor (MOSFET), a source thereof is electrically connected to ground, a drain thereof is electrically connected to the base of the first switch Q1, and gate thereof is electrically connected to the signal-resetting terminal reset. One end of the second filtering capacitor Cf2 is electrically connected to the gate of the third switch Q3 and the other is electrically connected to ground. An anode of the schottky diode Ds is electrically connected to the signal-inputting terminal INPUT.

The first output short circuit protecting device 80 sensing the voltages across the first outputting resistor Ro1 and the second outputting resistor Ro2 to determine whether the electronic system PS is short or not. The amplified signals outputted from the first operational amplifier A1 and second operational amplifier A2 respectively outputs an amplified signal to the first comparator C1 and second comparator C2. The first comparator C1 compares the amplified signal outputted from the first operational amplifier A1 and a first reference voltage Vref1, and the second comparator C2 compares the amplified signal outputted from the second operational amplifier A2 and a second reference voltage Vref2. When one of voltages across the first outputting resistor Ro1 or the second outputting resistor Ro2 is pretty large, the compared signal outputted from the first comparator C1 or the second comparator C2 slews, and then the judging element G outputs a trigger signal with low logic level to the signal-inputting terminal INPUT of the latching unit 804

The trigger signal drives the second switch Q2 turns on. The first switch Q1 turns on when the voltage across the base and the emitter divided by the first dividing resistor R4 and second dividing resistor R5 is larger than 0.7 volt, and then the signal-controlling terminal Sin is latch with low logic level. Thus the switch 54 opens, and there is no electricity outputted from the first electricity outputting terminal V1 and the second electricity outputting terminal V2.

When the short circuit condition is dismiss from the electronic system PS, the electronic system PS sends a signal to the power manager 56 via the signal-inputting terminal PS_On, and then the power manager 56 outputs a signal with high logic level to the latching unit 804 via the signal-resetting terminal reset to turn the third switch Q3 on. As the same time, the first switch Q1 and second switch Q2 turn off, and the switching element 54 closes, and then electricity converted by DC to DC power converter 504 is transmitted to the electronic system PS via the first electricity outputting terminal V1 and the second electricity outputting terminal v2.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An output short circuit protecting device comprising electrically connected to a power supplying device and an electronic system, the power supplying device comprising an alternative current to direct current power converting module, a controller, a switching element, a first outputting resistor, a second outputting resistor, a third outputting resistor, a first electricity outputting terminal, a second electricity outputting terminal, a standby electricity outputting terminal, a signal-controlling terminal, and a signal-resetting terminal, the AC to DC power converting module comprising a DC electricity outputting terminal, the switching element electrically connected to the DC electricity outputting terminal and the signal-controlling terminal, the first outputting resistor electrically connected to the switching element and the first electricity outputting terminal, the second outputting resistor electrically connected to the switching element and the second electricity outputting terminal, the third outputting terminal electrically connected to the DC electricity outputting terminal and the standby electricity outputting terminal, the first electricity outputting terminal, the second electricity outputting terminal, and the standby electricity outputting terminal electrically connected to the electronic system, respectively, the output short circuit protecting device comprising:
    a first outputting short circuit protecting module electrically connected to the first outputting resistor and the second outputting resistor, the first outputting short circuit protecting module comprising:
    a sensing unit electrically connected to the switching element, the first outputting resistor, and the second outputting resistor;
    a comparing unit electrically connected to the sensing unit;
    a judging element electrically connected to the comparing unit, the controller, and the signal-controlling terminal; and
    a latching unit electrically connected to the judging unit, the signal-controlling terminal, and the signal-resetting terminal,
    wherein the sensing unit senses voltages across the first outputting resistor and the second outputting resistor, the comparing unit respectively determines whether the voltages across the first outputting resistor and the second outputting resistor is larger than a predetermined value or not, the judging element sends a signal to latching unit for latching the signal-controlling terminal and driving the switching element cut off if one of the voltages across the first outputting resistor and the second outputting resistor is larger than the predetermined value, so that the first electricity outputting terminal and the second electricity outputting terminal stop outputting electricity to the electronic system.

2. The output short circuit protecting device in claim 1, wherein the sensing unit comprises a first operational amplifier and a second operational amplifier, the first operational amplifier comprises an inverting input, a non-inverting input, and an output, the inverting input of the first operational amplifier is electrically connected to the switching element, the non-inverting input of the operational amplifier is electrically connected to the first electricity outputting terminal, the output of the first operational amplifier is electrically connected to the comparing unit, the second operational amplifier comprises an inverting input, a non-inverting input, and an output, the inverting input of the second operational amplifier is electrically connected to the switching element, the non-inverting input of the second operational amplifier is electrically connected to the second electricity outputting terminal, and the output of the second operational amplifier is electrically connected to the comparing unit.

3. The output short circuit protecting device in claim 2, wherein the comparing unit comprises a first comparator and a second comparator, the first comparator comprises an inverting input, a non-inverting input, and an output, the inverting input of the first comparator is electrically connected to the output of the first operational amplifier, the non-inverting input of the first comparator is used for inputting a first reference voltage, the output of the first comparator is electrically connected to the judging element, the second comparator comprises an inverting input, a non-inverting input, and an output, the inverting input of the second comparator is electrically connected to the output of the second operational amplifier, the non-inverting of the second comparator is used for inputting a second reference voltage, and the output of the second comparator is electrically connected to the judging element.

4. The output short circuit protecting device in claim 3, wherein the latching module comprising:
    a first switch electrically connected to the judging element and the signal-controlling terminal;
    a second switch electrically connected to the first switch;
    a third switch electrically connected to the first switch, the second switch, and the signal-resetting terminal;
    a current-limiting resistor electrically connected to the first switch and the second switch;
    a first voltage-dividing resistor electrically connected to the second switch; and
    a second voltage-dividing resistor electrically connected to the first switch and the second switch.

5. The output short circuit protecting device in claim 4, wherein the latching unit further comprise a first filtering capacitor and a second filtering capacitor, the first filtering capacitor is electrically connected to the second voltage-dividing resistor in parallel, the second filtering capacitor is electrically connected to the signal-resetting terminal and the third switch.

6. The output short circuit protecting device in claim 5, wherein the latching unit further comprises a schottky diode electrically connected to the judging element, the first switch, and the second switch.

7. The output short circuit protecting device in claim 6, further comprising a second output short circuit protecting module electrically connected to the third outputting resistor and the controller.

8. The output short circuit protecting device in claim 7, wherein the second output short circuit protecting module comprises an operational amplifier, a comparator, and a photo coupler, the operational amplifier comprising an inverting input, a non-inverting input, and an output, the inverting input of the operational amplifier is electrically connected to the DC electricity outputting terminal, the non-inverting input of the operational amplifier is electrically connected to the standby electricity outputting terminal, the comparator comprises an inverting input, a non-inverting input, and an output, the inverting input of the comparator is electrically connected to the output of the operational amplifier, the non-inverting input of the comparator is used for inputting a third reference voltage, the output of the comparator is electrically connected to the photo coupler, the photo coupler is electrically connected to the controller.

9. The output short circuit protecting device in claim 8, wherein the photo coupler comprising a lighting element and light-receiving element, the lighting element is electrically connected to the output of the comparator, and the light-receiving element is electrically connected to the controller.

10. The output short circuit protecting device in claim 3, wherein the judging element is an AND gate.

11. The output short circuit protecting device in claim 10, wherein the latching module comprising:
    a first switch electrically connected to the judging element and the signal-controlling terminal;
    a second switch electrically connected to the first switch;
    a third switch electrically connected to the first switch, the second switch, and the signal-resetting terminal;
    a current-limiting resistor electrically connected to the first switch and the second switch;

a first voltage-dividing resistor electrically connected to the second switch; and a second voltage-dividing resistor electrically connected to the first switch and the second switch.

12. The output short circuit protecting device in claim 11, wherein the latching unit further comprise a first filtering capacitor and a second filtering capacitor, the first filtering capacitor is electrically connected to the second voltage-dividing resistor in parallel, the second filtering capacitor is electrically connected to the signal-resetting terminal and the third switch.

13. The output short circuit protecting device in claim 12, wherein the latching unit further comprises a schottky diode electrically connected to the judging element, the switch, and the second switch.

14. The output short circuit protecting device in claim 13, further comprising a second output short circuit protecting module electrically connected to the third outputting resistor and the controller.

15. The output short circuit protecting device in claim 14, wherein the second output short circuit protecting module comprises an operational amplifier, a comparator, and a photo coupler, the operational amplifier comprising an inverting input, a non-inverting input, and an output, the inverting input of the operational amplifier is electrically connected to the DC electricity outputting terminal, the non-inverting input of the operational amplifier is electrically connected to the standby electricity outputting terminal, the comparator comprises an inverting input, a non-inverting input, and an output, the inverting input of the comparator is electrically connected to the output of the operational amplifier, the non-inverting input of the comparator is used for inputting a third reference voltage, the output of the comparator is electrically connected to the photo coupler, and the photo coupler is electrically connected to the controller.

16. The output short circuit protecting device in claim 15, wherein the photo coupler comprising a lighting element and a light-receiving element, the lighting element is electrically connected to the output of the comparator, and the light-receiving element is electrically connected to the controller.

\* \* \* \* \*